(12) United States Patent
Tseng

(10) Patent No.: US 7,295,353 B2
(45) Date of Patent: Nov. 13, 2007

(54) MOVABLE LOCKING DEVICE FOR A SCANNER AND LOCKING METHOD FOR THE SAME

(75) Inventor: Jen-Shou Tseng, Taipei (TW)

(73) Assignee: Transpacific IP, Ltd., Taipei (TW)

(*) Notice: Subject to any disclaimer, the term of this patent is extended or adjusted under 35 U.S.C. 154(b) by 752 days.

(21) Appl. No.: 10/270,328

(22) Filed: Oct. 15, 2002

(65) Prior Publication Data
US 2003/0123103 A1 Jul. 3, 2003

(30) Foreign Application Priority Data
Dec. 27, 2001 (TW) .............................. 90132622 A

(51) Int. Cl.
*H04N 1/04* (2006.01)
*H04N 1/00* (2006.01)

(52) U.S. Cl. .................... 358/497; 358/474; 358/471; 358/483; 358/482

(58) Field of Classification Search ............... 358/497, 358/494, 474, 471, 400, 500, 505, 506, 487, 358/496, 483, 482; 399/211, 212, 380, 379; 250/239, 234–236, 216, 208.1; 382/312, 382/318, 319; 16/254, 235, 221
See application file for complete search history.

(56) References Cited

U.S. PATENT DOCUMENTS 5,767,977 A * 6/1998 Thelen et al. ............... 358/296
5,769,515 A * 6/1998 Chang ...................... 312/223.2
5,973,866 A * 10/1999 Tseng ......................... 359/896
6,247,374 B1 * 6/2001 Tseng ......................... 74/89.22
6,305,676 B1 * 10/2001 Peng .......................... 267/160
6,402,034 B1 * 6/2002 Yeh ........................ 235/472.01
6,450,727 B2 * 9/2002 Lu ........................... 403/322.1
6,529,294 B1 * 3/2003 Chang ........................ 358/471
6,700,717 B2 * 3/2004 Lee ............................ 359/896
6,937,368 B2 * 8/2005 Liu ............................ 358/474

FOREIGN PATENT DOCUMENTS

JP 04264542 A * 9/1992
JP 2003307796 A * 10/2003

* cited by examiner

*Primary Examiner*—Cheukfan Lee
(74) *Attorney, Agent, or Firm*—Stolowitz Ford Cowger LLP

(57) ABSTRACT

Embodiments of the claimed subject matter comprise a movable locking device for a scanner. In one embodiment, the movable locking device is used to affix a moving mechanical part inside a scanner, such as inside an optical chassis of the scanner. In this embodiment, the scanner comprises a platform, a lifting cover and a hinge set. The scanner uses the hinge set to allow the lifting cover to rotate relatively to the platform. The locking device includes a movable structure member and a buckling groove, in which the movable structure member includes a stopping piece and a holding rod used as the axis of rotation of the hinge set.

27 Claims, 2 Drawing Sheets

MOVABLE LOCKING DEVICE FOR A SCANNER AND LOCKING METHOD FOR THE SAME

This application incorporates by reference Taiwan Application Serial No. 90132622, filed on Dec. 27, 2001.

BACKGROUND OF THE INVENTION

1. Field of the Invention

This invention relates to a movable locking device for a scanner, and more particularly, to a movable locking device, which can be shared with a connection device of the lifting cover of a scanner.

2. Description of Related Art

As an apparatus capable of capturing an image, the scanner can be used to scan a photographic picture, a word document, a graphic pattern, an inserted picture, or even a three-dimensional subject, such as a coin or a spine tissue. After scanning, the result can be converted into the data, which has the digital data format and is capable of being displayed, edited, stored and outputted on a computer. The scanner offers the user much versatility in its application. For example, an art pattern or a photographic picture can be combined into a word document, in which the words are scanned and inputted to the software of document processor. As a result, the time for typing the words again can be saved; the fax content can be scanned and inputted to the databank or a software of document process for storage; the multimedia material can be added with an active pictures; the data integrated with picture format in a briefing can more effectively express the substance of the presentation; and so on. Due to its many advantages, the scanner has become a necessary peripheral device for the personal user or company having the personal computer.

A conventional scanner includes a scanning platform and a scanning lift cover. On the top of the scanning platform is a glass platform used to dispose a graphic pattern to be scanned. Through the glass platform, the inner structure devices of the scanning platform can be clearly observed. The scanning platform mainly includes an optical chassis and a transmission device, in which the optical chassis has the ability to receive the image. The optical chassis mainly includes a light source and a photosensing device, such as a charge coupled device (CCD), a contact image sensor (CIS), or another sensing device that can convert the optical signal into an electrical signal. When the scanner starts the scanning operation, the transmission device can drive the optical chassis. The light beam emitted by the light source is reflected by a graphic pattern to be scanned on opaque document, or is directly transmitted through a graphic pattern of a transparent document. The optical chassis receives the optical signals and converts them into electrical signals for processing, so as to accomplish the scanning operation.

However, the quality of the scanning can be affected if the optical chassis inside the scanner is shaken or shifted, for example, during the process of transporting the scanner from the manufacturer to the seller or from one place to another place as the user chooses. The shaking or shifting of the optical chassis inside the scanner can result in a deviation from the original design and affect the scanning quality negatively. In order to prevent this kind of situation from occurring, the conventional method has an additional design for a retainer on the housing of the scanner, so as to affix the optical chassis. However, this manner is not only time consuming but also difficult for managing the device elements. As a result, the fabrication cost is increased. Moreover, some scanners do not include the design of a retainer at all.

SUMMARY OF THE INVENTION

It is therefore an objective of the present invention to provide a movable locking device in a scanner. The locking device is commonly coupled with scanner, so as to achieve the function of affixing the moving mechanical part, such as the optical chassis.

In accordance with the foregoing and other objectives of the present invention, a movable locking device for a scanner is provided and is used to affix a moving mechanical part inside the scanner, such as the optical chassis, wherein the scanner uses a hinge set to allow the lifting cover to rotate relatively to the platform. Also, a holding rod under the hinge set is disposed into an inserting hole on the platform, so as to couple the lifting cover and the platform. The locking device includes a movable structure member and a buckling groove, in which the movable structure member and the holding rod are coupled by an inserting manner, and the holding rod is used as the axis of rotation. A stopping piece is implemented at a side of the movable structure member. The buckling groove is located on the movable structure member and includes a passing groove and a fixing groove, and their shapes and positions are with respect to the stopping piece. The moving direction of the passing groove is parallel to the moving direction of the movable structure member. The movable structure member also has an opening at the side. The fixing groove is perpendicular to the moving direction of the movable structure member. When the stopping piece is inserted into the passing groove, the movable structure member is movable. When the stopping piece is disposed into the fixing groove, the movable structure member is stopped by the stopping piece and can not be moved.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The principle of the movable locking device for a scanner of the present invention mainly is using a hinge set fit with a movable structure member. Also, a buckling groove is implemented on a moving mechanical part, such as on an optical chassis, inside the scanner, and the shape and the position are with respect to the buckling groove. By making use of the association between the buckling groove and the movable structure member, the present invention achieves the effect of affixing or releasing the moving mechanical part.

Figure 1:
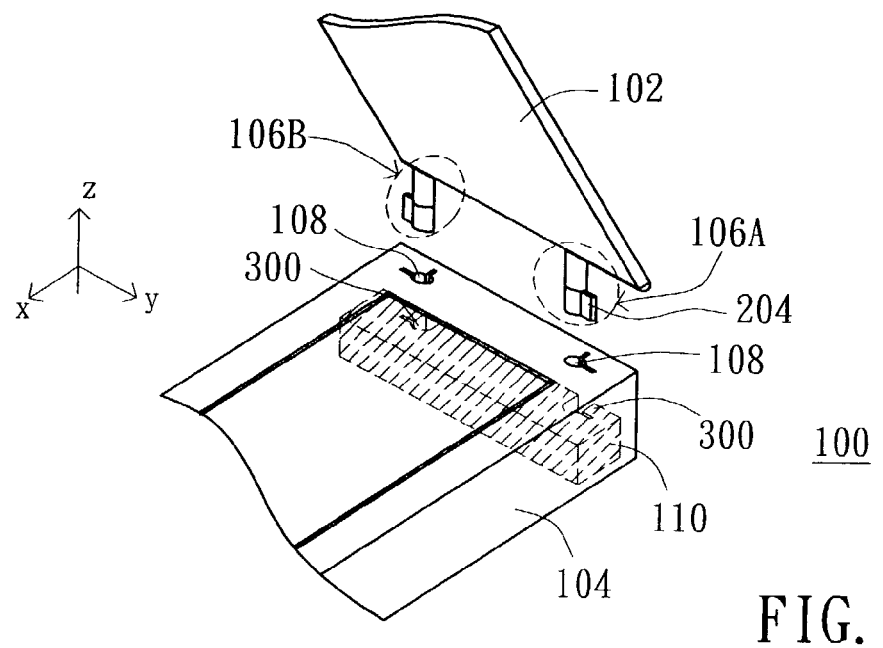
FIG. 1 shows a perspective view, schematically illustrating the movable locking device for a scanner, according to a preferred embodiment of the present invention.
Figures 2A, 2B:
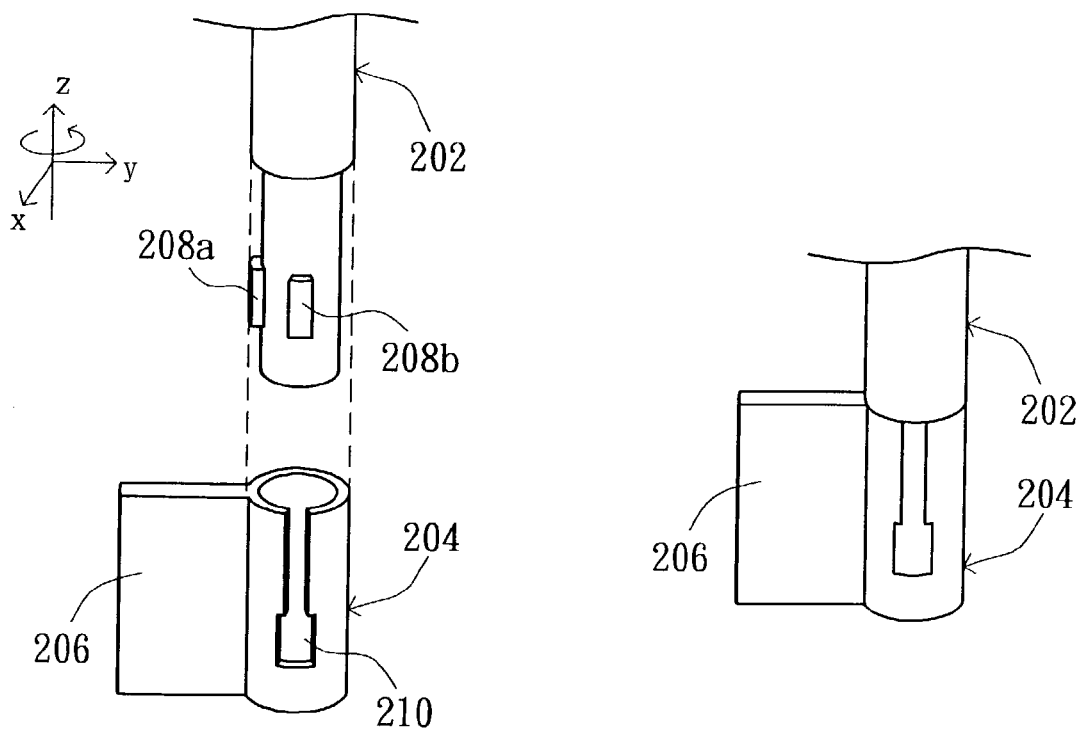
FIG. 2A is an expansion drawing for the composition members in accordance with FIG. 1.
FIG. 2B is an explosion drawing for the composition members with respect to FIG. 2A.

Referring to FIG. 1, it shows a perspective view, schematically illustrating the movable locking device for a scanner, according to a preferred embodiment of the present invention. The scanner 100 includes a lifting cover 102 and a platform 104. Also, at two sides of and under the lifting cover 102, the hinge sets 106A and 106B are coupled, so that the lifting cover 102 is rotatable relative to the platform 104. A holding rod, to be described with more detail with reference to FIGS. 2A and 2B, is implemented at the lower side of the hinge sets 106A and 106B, and the holding rod is inserted into an inserting hole 108 on the platform 104, so that the coupling between the lifting cover 102 and the platform 104 is accomplished. The platform 104 is implemented with a moving mechanical part inside, such as the optical chassis 110, when driven by a transmission device (not shown in FIG. 1) moves back and forth on the platform 104, so as to proceed with the scanning operation of the image.

Further still, the holding rod under the hinge sets 106A and 106B is coupled to a movable structure member 204 of the present invention by a fitting manner. The buckling groove 300 is also formed on the optical chassis 110 and has a shape and a position with respect to the movable structure member 204. Even though FIG. 1 shows only two hinge sets 106A and 106B on which the movable structure member 204 is fit from the lower side, the present invention is not actually limited to this design. In the invention, it has been sufficient to have the locking function with only one hinge set being coupled with the movable structure member.

FIG. 2A is an expansion drawing for the composition members in accordance with FIG. 1. The holding rod 202 disposed at the lower side of the hinge set 106 is coupled with the movable structure member 204, and a stopping piece 206 is implemented on the movable structure member 204. FIG. 2B is an explosion drawing for the composition members with respect to FIG. 2A. The holding rod 202 has two positioning protruding points 208a and 208b, which are configured at 90 decrees with respect to each other in this embodiment, such that the holding rod may be configured in at least two positions 90 degrees from one another The movable structure member 204 at the sidewall has an opening 210 at a sidewall thereof. When the movable structure member 204 and the holding rod 202 are coupled in fit, the positioning protruding point 208a or 208b protrudes out from the opening 210, so as to position the movable structure member 204. Then the stopping piece 206 uses the holding rod 202 as the axis of rotation. In other words, it is surrounding the z-axis of the coordinate axis for rotation. In this preferred embodiment, the positioning protruding points are of an elastic pressing type. When the movable structure member 204 is rotated, the positioning protruding point 208a, originally being in a protruded state, is pressed by the sidewall and then is retracted back. The rotation continues until the opening 210 is matched to the other positioning protruding point 208b to have the buckling be coupled again.

Figure 3:
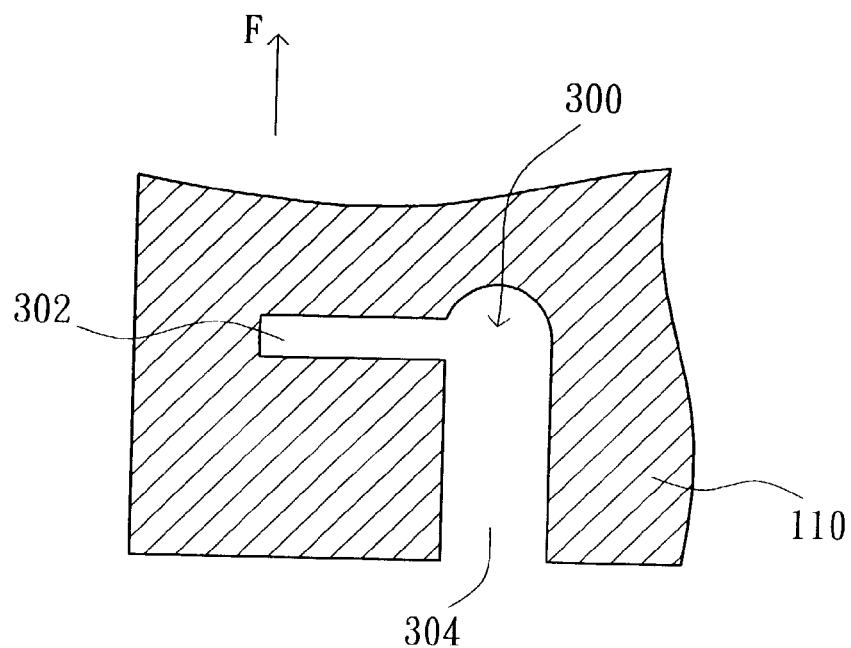
FIG. 3 shows a top view, schematically illustrating the buckling groove in FIG. 1.

FIG. 3 shows a top view, schematically illustrating the buckling groove in FIG. 1. The buckling groove 300 located on the optical chassis 110 includes a fixing groove 302 and a passing groove 304. The shape and the position of the buckling groove 300 are with respect to a bottom surface of the movable structure member 204, in which the arrow indicated by F represents the moving direction of the optical chassis 110. The direction of the fixing groove 302 is perpendicular to the moving direction of the optical chassis 110. The passing groove 304 at the side of the moving mechanical part forms an opening and is parallel to the moving direction of the optical chassis 110.

Figure 4:
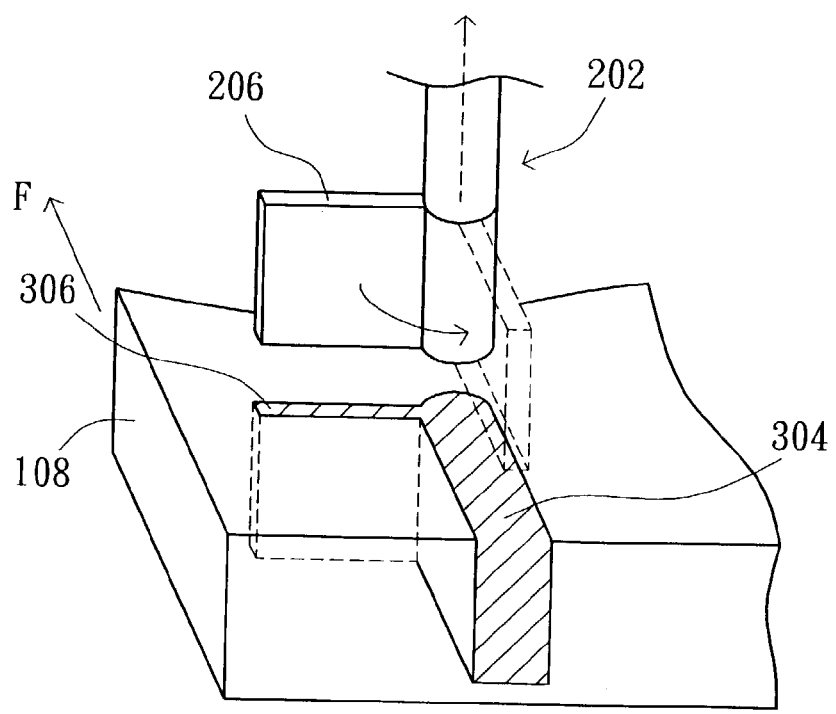
FIG. 4 is a drawing, schematically illustrating the coupling relation between the movable structure member and the buckling groove.

Referring to FIG. 4, it is a drawing, schematically illustrating the coupling relation between the movable structure member 204 and the buckling groove 300. From the FIG. 4, it can be seen that when the stopping piece 206 is disposed inside the fixing groove 302 as shown by the solid line, the optical chassis 110 is blocked by the stopping piece 206 and can not be moved back and forth. When the stopping piece 206 is disposed in the passing groove 304 as shown by the dashed line, the optical chassis 110 can be moved back and forth.

According to the foregoing descriptions, while the scanner is under transportation, such as distribution to the market sellers or the user moving it from one place to another place, the moving mechanical part inside the scanner can be affixed by using the stopping piece and the buckling groove introduced by the present invention to achieve the affixing effect. In addition, referring to FIG. 1 again, when it is desired to affix the optical chassis 100 not being moved, the stopping piece of the movable structure member only needs to be rotated in the direction perpendicular to the moving direction of the optical chassis 100 and couple the lifting cover 102 and the platform 104, so as to allow the stopping piece 206 to be inserted to the fixing groove 302. When the user intends to perform the scanning operation, the lifting cover 102 is taken out from the platform 104, and the stopping piece 206 is rotated parallel to the moving direction of the optical chassis 110. The lifting cover 102 and the platform 104 are then coupled and the stopping piece 206 is inserted into the passing groove 304.

Further still, since the lifting cover 102 does not use a retaining device, such as a screw, bolt, and so on, to fix onto the platform 104, the lifting cover 102 can be adjusted up and down along the z-axis direction, in accordance with the thickness and the height of the document to be scanned.

It should be noted that the number of positioning protruding points can be one or more. The number has no specific limitation. Furthermore, the positioning protruding point in a different application can be omitted. Instead, the shape or the material can be used in association between the movable structure member and the holding rod, so as to have the purpose of using the stopping piece for positioning. The shape of the buckling is also not specifically limited. In addition to the L shape as shown in the embodiment, for example, the T shape or the cross shape is also acceptable, such that it can likewise achieve the effect of stopping the optical chassis or releasing the optical chassis. In addition, the buckling groove shown in FIG. 3 is formed on the upper surface of the optical chassis; however, it can also be formed at the side or the back of the optical chassis by using the external protruding manner, so as to form the buckling groove that can be matched with the movable structure member, and the locking effect can also be achieved.

In summary, the movable locking device disclosed in the foregoing embodiment of the present invention can be used in a scanner. The advantages are as follow:

1. The present invention can affix the moving mechanical part, so as to prevent the moving mechanical part from being rotated or shaken during the transportation process for the scanner. The quality of the scanner can remain.

2. The present invention can lock or release the moving mechanical part according to the actual need, in which the moving mechanical part can be released in a very easy procedure and the assembling time can be reduced.

3. The present invention uses the moving mechanical part and the hinge sets to be coupled together. In this design of one piece with dual functions, the management of the components can be eased and the fabrication cost can be reduced.

The invention has been described by using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A movable locking device, to affix a moving mechanical part inside a scanner, wherein the scanner has a lifting cover and a platform, the scanner including a hinge set to allow the lifting cover to rotate relatively to the platform, a holding rod of the hinge set disposed in an inserting hole on the platform, the locking device comprising:
   a movable structure member, coupled with the holding rod, wherein the holding rod is used as an axis of rotation, and a stopping piece is implemented at a sidewall of the movable structure member; and
   a buckling groove, located on the moving mechanical part, comprising a passing groove and a fixing groove, in which the shapes and the positions of the passing groove and the fixing groove are with respect to the stopping piece, wherein a moving direction of the passing groove is parallel to a moving direction of the movable structure member, and the movable structure member also has an opening at a side thereof, wherein the fixing groove is perpendicular to the moving direction of the movable structure member, wherein when the stopping piece is disposed into the passing groove, the movable structure member is movable, and wherein when the stopping piece is disposed into the fixing groove, the movable structure member is stopped by the stopping piece.

2. The movable locking device as recited in claim 1, wherein the holding rod is further implemented with a positioning protruding point, adapted to determine a position of the movable structure member.

3. The movable locking device as recited in claim 2, wherein the holding rod has two positioning protruding points, adapted to affix the movable structure member by two stages.

4. The movable locking device as recited in claim 1, wherein the passing groove and the fixing groove have an L-like shape.

5. The movable locking device as recited in claim 1, wherein the passing groove and the fixing groove have a T-like shape.

6. The movable locking device as recited in claim 1, wherein the passing groove and the fixing groove have a cross-like shape.

7. The movable locking device as recited in claim 1, wherein the moving mechanical part includes an optical chassis.

8. A scanner with a movable locking device, comprising:
   a platform, the platform having an inserting hole at each of two sides at the rear thereof, and the platform comprising a moving mechanical part;
   a lifting cover, wherein a hinge set is implemented at each of two sides of and under the lifting cover, and the hinge set has a holding rod disposed in the inserting hole, so as to couple the platform and the lifting cover; and
   a locking device, comprising:
   a movable structure member; coupled with the holding rod, wherein the holding rod is used as an axis of rotation, and a stopping piece is implemented at a sidewall of the movable structure member; and a buckling groove, located on the moving mechanical part, comprising a passing groove and a fixing groove, in which a shape as well as a position of the passing groove and the fixing groove are with respect to the stopping piece, wherein a moving direction of the passing groove is parallel to a moving direction of the movable structure member, and the movable structure member also has an opening at a side thereof, the fixing groove is perpendicular to the moving direction of the movable structure member, wherein when the stopping piece is disposed into the passing groove, the movable structure member is movable, and wherein when the stopping piece is disposed in the fixing groove, the movable structure member is stopped by the stopping piece.

9. The scanner as recited in claim 8, wherein the holding rod further includes a positioning protruding point, adapted to determine a position of the movable structure member.

10. The scanner as recited in claim 9, wherein the holding rod comprises two positioning protruding points, adapted to affix the movable structure member in two stages.

11. The scanner as recited in claim 8, wherein the passing groove and the fixing groove have an L-like shape.

12. The scanner as recited in claim 8, wherein the moving mechanical part includes an optical chassis.

13. A locking method, to affix a moving mechanical part inside a scanner, wherein the scanner has a lifting cover and a platform, the scanner uses a hinge set to allow the lifting cover to rotate relatively to the platform, a holding rod of the hinge set is disposed in an inserting hole on the platform, the moving mechanical part includes a buckling groove, composed of two grooves respectively in a parallel direction and in a perpendicular direction respectively to the moving mechanical part, the locking method comprising:
   taking the lifting cover out from the platform;
   adjusting a stopping piece located at a side of the movable structure member, wherein a position of the stopping piece and the moving direction of the moving mechanical part are perpendicular; and
   putting the lifting cover back to the platform, so as to allow the stopping piece to be inserted into the buckling groove and to block the moving mechanical part.

14. A scanner comprising:
   a scanner body having a mounting hole;
   an optical chassis located in the scanner body; and
   a scanner cover, where the cover includes a cover hinge having a lower member configured to be inserted through the mounting hole of the scanner body and into an opening of the optical chassis to prohibit movement of the optical chassis when the scanner is in a non-operational state.

15. The scanner according to claim 14 where the lower member of the cover hinge is configured to be rotated prior to being inserted into the mounting hole, such that the lower member does not prohibit movement of the optical chassis when the scanner cover is mounted to the scanner body and the scanner is in a state of operation.

16. The scanner according to claim 14 where the lower member includes a stopping piece that is oriented perpendicular to a direction of movement of the optical chassis associated with a scanning operation.

17. The scanner according to claim 16 where the lower member of the cover hinge is configured to be rotated prior to being inserted into the mounting hole such that the stopping piece is oriented parallel to the direction of movement of the optical chassis when the scanner is in a state of operation.

18. The scanner according to claim 17 where the opening of the optical chassis includes perpendicular grooves for accepting the lower member of the cover hinge when the scanner is in either of the non-operational state and the state of operation.

19. The scanner according to claim 14 where the cover hinge is not rigidly attached to the scanner body, and the cover is configured to move up and down according to a thickness of a scanned object, the cover remaining parallel to a top surface of the scanner body as the cover moves up and down.

20. The scanner according to claim 14 where the cover hinge further includes:
   a holding rod oriented perpendicular to a top surface of the scanner body; and
   a stopping piece attached perpendicular to the holding rod, where the stopping piece is configured to fit into the opening of the optical chassis.

21. An apparatus comprising:
   means for pivotably connecting a scanner cover to a scanner body, including a mounting means configured to be inserted into a mounting hole of the scanner body; and
   means for prohibiting movement of an optical chassis when the scanner is in a non- operational state, where the mounting means is further configured to pass through the mounting hole and into an opening of an optical chassis in order to constrain a movement of the optical chassis when the scanner is in a non-operational state.

22. The apparatus according to claim 21 including a means for rotating the mounting means prior to pivotably connecting the scanner cover to the scanner body, such that the mounting means does not prohibit movement of the optical chassis when the scanner is in a state of operation.

23. The apparatus according to claim 21 where the mounting means includes a stopping means that is oriented perpendicular to a direction of movement of the optical chassis associated with a scanning operation.

24. The apparatus according to claim 23 including a means for rotating the mounting means such that the stopping means is oriented parallel to the direction of movement of the optical chassis when the scanner is in a state of operation.

25. The apparatus according to claim 24 where the opening of the optical chassis includes perpendicular grooves for accepting the mounting means when the scanner is in either of the non-operational state and the state of operation.

26. The apparatus according to claim 21 including a stopping means attached to the mounting means, where the stopping means is passed into the opening of the optical chassis.

27. The apparatus according to claim 26 including a means for rotating the stopping means prior to inserting the mounting means into the mounting hole of the scanner body.

* * * * *

UNITED STATES PATENT AND TRADEMARK OFFICE
CERTIFICATE OF CORRECTION

PATENT NO. : 7,295,353 B2 Page 1 of 1
APPLICATION NO. : 10/270328
DATED : November 13, 2007
INVENTOR(S) : Tseng It is certified that error appears in the above-identified patent and that said Letters Patent is hereby corrected as shown below:

At column 6, line 5 Claim 8, please replace "structure member; coupled" with --structure member, coupled--.

Signed and Sealed this

Twenty-fifth Day of May, 2010

David J. Kappos
*Director of the United States Patent and Trademark Office*